(12) United States Patent
Jehan et al.

(10) Patent No.: US 10,372,757 B2
(45) Date of Patent: Aug. 6, 2019

(54) SEARCH MEDIA CONTENT BASED UPON TEMPO

(71) Applicant: Spotify AB, Stockholm (SE)

(72) Inventors: Tristan Jehan, Brooklyn, NY (US); Dariusz Dziuk, Stockholm (SE); Rahul Sen, Stockholm (SE); Nikolaos Toumpelis, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/883,295

(22) Filed: Oct. 14, 2015

(65) Prior Publication Data

US 2016/0342295 A1    Nov. 24, 2016

Related U.S. Application Data

(60) Provisional application No. 62/163,927, filed on May 19, 2015.

(51) Int. Cl.
*G06F 16/683* (2019.01)

(52) U.S. Cl.
CPC .................. *G06F 16/683* (2019.01)

(58) Field of Classification Search
CPC ......... A63B 69/0028; G10H 2240/131; G10H 2210/076; G06F 19/3481; G06F 17/30743; G06F 17/3074; G06F 17/30764; G06F 17/30032; G06F 3/0484; G06F 16/683
See application file for complete search history.

(56) References Cited

U.S. PATENT DOCUMENTS

| | | | |
|---|---|---|---|
| 8,101,843 B2 | 1/2012 | Turner | |
| 8,254,829 B1 | 8/2012 | Kindred et al. | |
| 8,626,607 B1 | 1/2014 | Wood et al. | |
| 9,503,500 B2 | 11/2016 | Bernhardsson et al. | |
| 2003/0205124 A1* | 11/2003 | Foote | G10G 1/00 84/608 |
| 2005/0020223 A1* | 1/2005 | Ellis | H04B 1/20 455/186.1 |
| 2005/0211072 A1* | 9/2005 | Lu | G10H 1/40 84/612 |
| 2005/0223879 A1* | 10/2005 | Huffman | G10H 1/0025 84/612 |
| 2006/0080356 A1* | 4/2006 | Burges | G06F 16/40 |

(Continued)

FOREIGN PATENT DOCUMENTS

| | | |
|---|---|---|
| EP | 1 705 588 A1 | 9/2006 |
| EP | 1821309 A1 | 8/2007 |

(Continued)

OTHER PUBLICATIONS

U.S. Appl. No. 14/883,252, filed Oct. 14, 2015 for "Repetitive Motion Activity Enhancement Based Upon Media Content Selection".

(Continued)

*Primary Examiner* — Amy Ng
*Assistant Examiner* — William Wong
(74) *Attorney, Agent, or Firm* — Merchant & Gould P.C.

(57) ABSTRACT

A media system includes: media-playback device including: a media-output device that plays media content items; and a tempo control engine configured to: receive a selection of a desired tempo; and suggest additional media content associated with the desired tempo.

14 Claims, 9 Drawing Sheets

(56) References Cited

U.S. PATENT DOCUMENTS

| | | |
|---|---|---|
| 2006/0107822 A1* | 5/2006 | Bowen .................. G10H 1/40 84/612 |
| 2006/0230065 A1 | 10/2006 | Plastina et al. |
| 2006/0243120 A1* | 11/2006 | Takai .............. G06F 17/30764 84/612 |
| 2006/0276919 A1* | 12/2006 | Shirai ............... A63B 71/0686 700/94 |
| 2007/0044641 A1* | 3/2007 | McKinney ........ A63B 71/0686 84/612 |
| 2007/0074617 A1 | 4/2007 | Vergo |
| 2007/0074618 A1* | 4/2007 | Vergo .................. G10H 1/00 84/612 |
| 2007/0074619 A1* | 4/2007 | Vergo .................. G10H 1/42 84/612 |
| 2007/0118043 A1* | 5/2007 | Oliver ................. A61B 5/0245 600/519 |
| 2007/0203421 A1* | 8/2007 | Cho .................... A61B 5/0002 600/519 |
| 2007/0204744 A1* | 9/2007 | Sako ................... G11B 27/329 84/612 |
| 2007/0261538 A1* | 11/2007 | Takai ................ A63B 24/0087 84/612 |
| 2008/0018625 A1 | 1/2008 | Ijichi et al. |
| 2008/0072740 A1 | 3/2008 | Horii et al. |
| 2008/0072741 A1* | 3/2008 | Ellis .................... G10H 1/0008 84/609 |
| 2008/0096726 A1* | 4/2008 | Riley ................ A63B 24/0006 482/8 |
| 2008/0147711 A1 | 6/2008 | Spiegelman et al. |
| 2008/0153671 A1* | 6/2008 | Ogg .................. A63B 71/0686 482/3 |
| 2009/0025539 A1* | 1/2009 | Sagoo .................. G10H 1/40 84/609 |
| 2009/0217804 A1* | 9/2009 | Lu ...................... G10H 1/0058 84/602 |
| 2010/0168879 A1* | 7/2010 | Takatsuka ........ A63B 24/0084 700/94 |
| 2011/0093100 A1* | 4/2011 | Ramsay ................ G06F 3/011 700/94 |
| 2012/0254907 A1 | 10/2012 | Serdiuk |
| 2013/0091167 A1* | 4/2013 | Bertin-Mahieux ......................... G06F 17/30743 707/769 |
| 2014/0270375 A1 | 9/2014 | Canavan et al. |
| 2014/0277648 A1 | 9/2014 | Chong et al. |
| 2015/0081066 A1* | 3/2015 | Yeh ..................... A61B 5/4815 700/94 |
| 2015/0142147 A1* | 5/2015 | Stanghed .......... G06F 17/30743 700/94 |
| 2016/0055420 A1 | 2/2016 | Karanam et al. |
| 2016/0092559 A1 | 3/2016 | Lind et al. |
| 2017/0195700 A1 | 7/2017 | Jin et al. |

FOREIGN PATENT DOCUMENTS

| | | |
|---|---|---|
| WO | 2006/072961 A2 | 7/2006 |
| WO | 2014/096832 A1 | 6/2014 |

OTHER PUBLICATIONS

U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media Content Selection".
U.S. Appl. No. 14/883,298, filed Oct. 14, 2015 for "Cadence-Based Playlists Management System".
U.S. Appl. No. 14/883,273, filed Oct. 14, 2015 for "Multi-Track Playback of Media Content During Repetitive Motion Activities".
U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/945,008, filed Nov. 18, 2015 for "Identifying Media Content".
U.S. Appl. No. 14/883,323, filed Oct. 14, 2015 for "Accessibility Management System for Media Content Items".
U.S. Appl. No. 14/883,336, filed Oct. 14, 2015 for "Selection and Playback of Song Versions Using Cadence".
U.S. Appl. No. 14/883,340, filed Oct. 14, 2015 for "Cadence-Based Selection, Playback, and Transition Between Song Versions".
International Search Report and Written Opinion from International Patent Application No. PCT/US2017/036575, dated Jul. 17, 2017.
The Echonest, "Analyzer Documentation", Version 3.2, Jan. 7, 2014, 7 pages.
Extended European Search Report for European Patent Application No. 16169963.2, dated Oct. 21, 2016, 9 pages.
Geoffray Bonnin et al: "Automated Generation of Music Playlists: Survey and Experiments", ACM Computing Surveys., vol. 47, No. 2, Nov. 12, 2014 (Nov. 12, 2014), pp. 1-35.
Summons to Attend Oral Proceedings from the European Patent Office for European Application No. 16169963.2, dated Oct. 31, 2017, 10 pages.
International Search Report and Written Opinion from International Patent Application No. PCT/US2017/036571, dated Aug. 4, 2017.

* cited by examiner

SEARCH MEDIA CONTENT BASED UPON TEMPO

CROSS-REFERENCE TO RELATED APPLICATION

This application claims priority to U.S. Ser. No. 62/163,927, filed on May 19, 2015, entitled SEARCH MEDIA CONTENT BASED UPON TEMPO, and which application is hereby incorporated by reference in its entirety.

BACKGROUND

Running, as well as many other recreation or fitness activities, include repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to a system for searching for media content of a desired tempo. Various aspects are described in this disclosure, which include, but are not limited to, the following aspects.

In one aspect, a media system includes: media-playback device including: a media-output device that plays media content items; and a tempo control engine configured to: receive a selection of a desired tempo; and suggest additional media content associated with the desired tempo.

In another aspect, a media system includes: media-playback device including a media-output device that plays media content items, and a tempo control engine configured to receive a selection of a desired tempo; and a server configured to filter a plurality of media content items to suggest one or more suggested media content items based upon the desired tempo provided by the media-playback device.

In yet another aspect, a method for selecting media content based upon tempo includes: receiving a selected tempo; identifying additional media content based upon the selected tempo; and providing the additional media content to a user.

DETAILED DESCRIPTION

Figure 1:
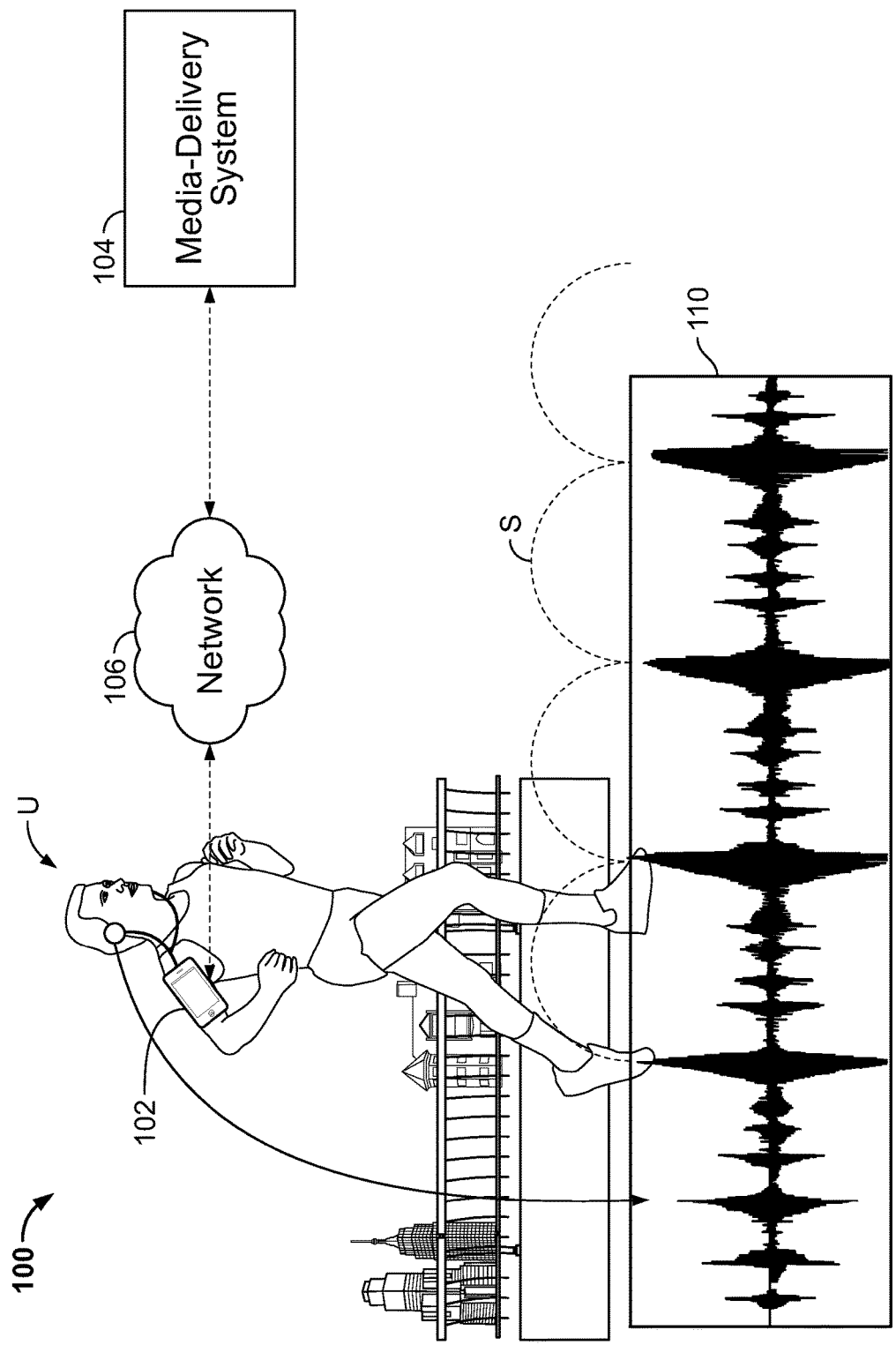
FIG. 1 illustrates an example system for tempo searching and media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive-motion activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

FIG. 1 illustrates an example system 100 for cadence determination and media content selection. The example system 100 includes a media-playback device 102 and a media-delivery system 104. The system 100 communicates across a network 106. Also shown, is a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a media content item having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media-playback device 102 operates to play music having a tempo that is within a predetermined range of a target tempo. In at least some embodiments, the predetermined range is plus or minus 2.5 BPM. For example, if the user U is running at a cadence of 180 steps per minute, the media-playback device 102 operates to play music having a tempo of 177.5-182.5 BPM. Alternatively, in other embodiments, the predetermined range is itself in a range from 1 BPM to 10 BPM.

Further, in some embodiments, the media-playback device 102 operates to play music having a tempo equal to or approximately equal to a user U's cadence after it is rounded. For example, the cadence may be rounded to the nearest multiple of 2.5, 5, or 10 and then the media-playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

Figure 2:
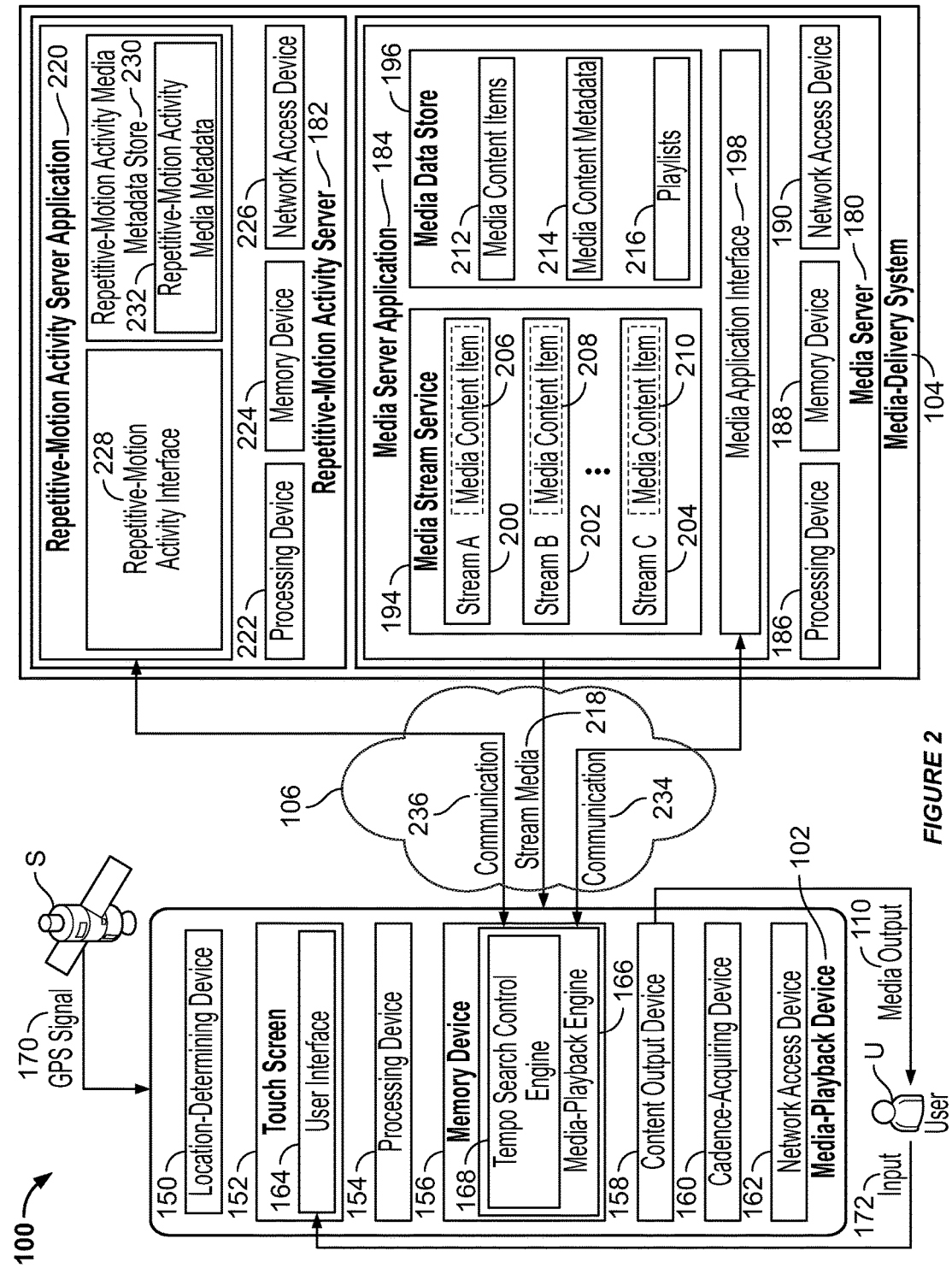
FIG. 2 is a schematic illustration of the example system of FIG. 1.

FIG. 2 is a schematic illustration of an example system 100 for cadence determination and media content selection. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, WI-FI® positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a tempo search control engine 168. In some embodiments, the media-playback engine 166 operates to playback media content and the tempo search control engine 168 operates to select media content for playback based on various conditions, such as tempo. Additional details regarding the tempo search control engine 168 are provided below.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a BLUETOOTH® transmitter, a display panel, and a video output jack. Other embodiments are possible as well. For example, the content output device 158 may transmit a signal through the audio output jack or BLUETOOTH® transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH®, ultra-wideband (UWB), 802.11, ZIGBEE®, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that correspond to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for cadence determination and media content selection, other embodiments are possible as well. For example, in some embodiments, the media-playback device 102 includes a media data store 196 and the media-playback device 102 is configured to perform cadence determination and media content selection without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
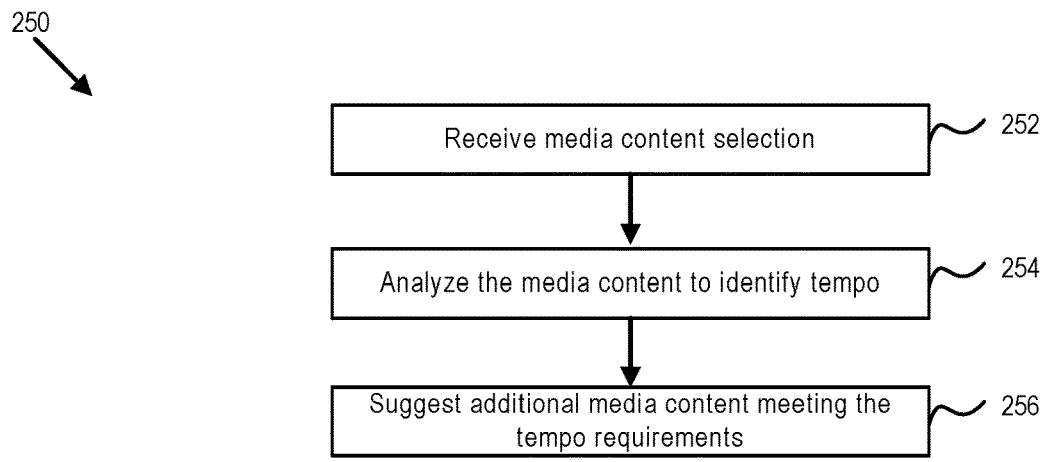
FIG. 3 illustrates an example method of selecting media content based upon tempo by some embodiments of the media-delivery system of FIG. 2.

FIG. 3 illustrates an example method 250 of selecting media content played by the media-playback device 102 based upon a tempo of the media content. Such a method can be used, for example, when the user is engaged repetitive motion activities, such as running or walking. Media content, such as music, can impact the performance of such activities. For example, as noted above, music of a faster tempo can encourage the user U to run at a faster cadence and vice versa.

At the step 252 of the method 250, the tempo search control engine 168 of the media-playback device 102 receives a selection of media content. This selection can take a variety of forms.

Figure 7:
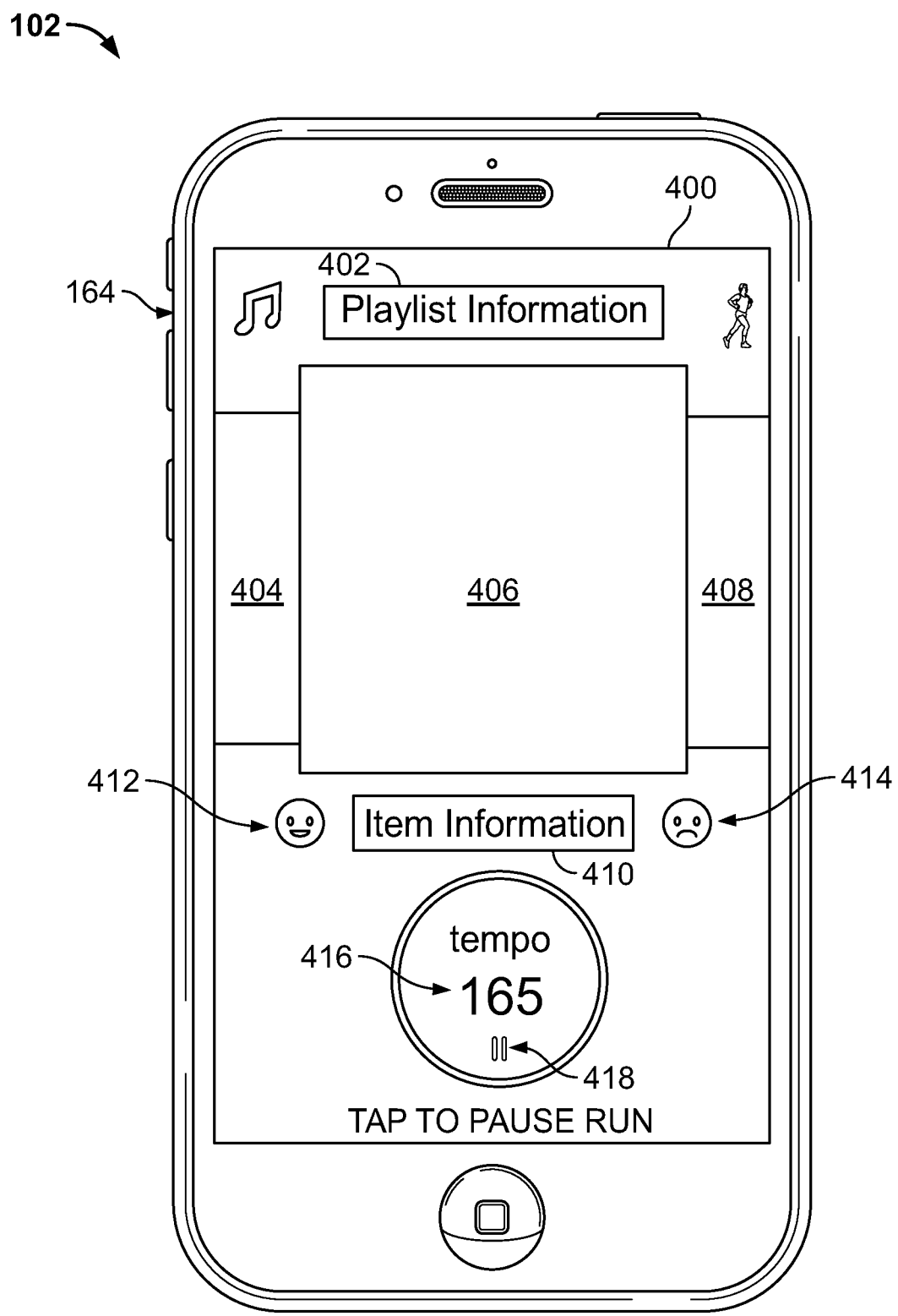
FIG. 7 shows an example tempo-based content playback screen displayed by some embodiments of the user interface of FIG. 2.

For example, the user U can simply identify certain media content of a desired tempo. In another example, the user can identify a desired tempo itself (e.g., 90 beats per minute), as shown in FIG. 7 and described further below.

In yet other examples, one or more automated processes can be used to select certain media content and/or tempo. For example, various attributes of the user, such as the user's physiological state, can be used as an automated process for selecting a desired tempo. An example of such processes are described in U.S. Patent Application Ser. No. 62/163,915, titled HEART RATE CONTROL BASED UPON MEDIA CONTENT SELECTION, filed on May 19, 2015, the entirety of which is hereby incorporated by reference. This patent application describes how physiological measurements, such as heart rate, and non-physiological measurements, such as location, can be used to automatically select a desired tempo for the user U.

Next, at step 254, the selected media content is analyzed to identify a relevant tempo. Various processes can be used to analyze media content, such as music, to determine a tempo. See FIG. 4 for more details.

Finally, at step 256, additional media content meeting the desired tempo requirements are provided to the user, such as in a graphical user interface. One example of such a user interface is described with reference to FIG. 7 below. Other examples are provided in U.S. Patent Application Ser. No. 62/163,887, titled MULTI-TRACK PLAYBACK OF MEDIA CONTENT DURING REPETITIVE MOTION ACTIVITIES, filed on May 19, 2015, the entirety of which is hereby incorporated by reference. In that patent application, a grid interface is disclosed that allows media content of a particular In one context, the steps 254, 256 are performed by the media-delivery system 104 in response to a request from the tempo search control engine 168. For example, the tempo search control engine 168 can receive an indication of a desired tempo (either through selected media content or a specified tempo), and the media-delivery system 104 is configured to perform the steps 254, 256 and deliver media content of the desired tempo back to the media-playback device 102 for consumption by the user U.

Figure 4:
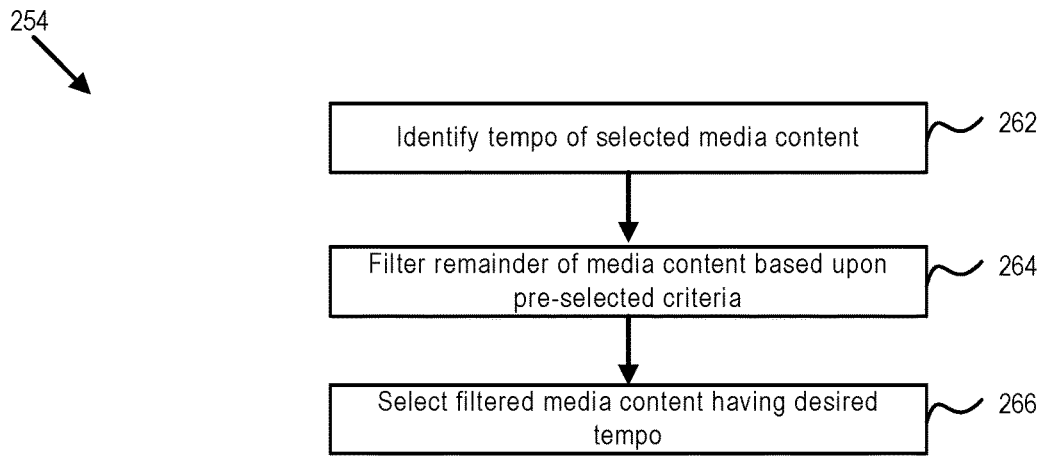
FIG. 4 illustrates an example method for analyzing the tempo of media content per the method shown in FIG. 3.

FIG. 4 illustrates more details about the step 254 of FIG. 3, in which media content is analyzed to identify tempo. As noted, the media-delivery system 104 can perform the step 254 based upon a request from the media-playback device 102.

At step 262, the relevant tempo is identified. In this context, the media content provided by the user U is analyzed to determine the tempo of the media content. This process is described below.

As noted, in other examples, the user can simply select a desired tempo instead of providing media content, or a tempo can automatically be provided based upon analysis of such criteria as physiological aspects of the user U, like heart rate.

Next, at step 264, the media content in the media server application 184 is filtered based upon certain criteria. In one example, each media content item stored by the media server application 184 is analyzed and particular additional metadata for each item is stored by the media content metadata 214.

This metadata may include such information as a tempo for the media content item. In one example, each media content item is analyzed, and a tempo is associated with the metadata for the item.

A tempo of a media content item can be determined in various known manners. In the example of songs, a tempo of a song can be relatively easily identified because songs typically have a steady tempo throughout their entire playing time. Where a tempo changes significantly throughout a song, in some embodiments, such variations in tempo can be averaged to represent a single tempo of the song. In other examples, a portion of the song having an approximately constant tempo can be identified, and such a constant tempo can be used as a tempo for the entire song. In yet other examples, the portion of the song having an approximately constant tempo is taken and used to replace the entire song while the other portion of the song, which has variable tempo, are excluded from playback. Other methods of obtaining a tempo of a song are also possible.

Additional details on determining a tempo for media content is provided in U.S. Patent Application Ser. No. 62/163,845, titled CADENCE-BASED PLAYLISTS MANAGEMENT SYSTEM, filed on May 19, 2015, the entirety of which is hereby incorporated by reference.

The metadata may also include other criteria, such as a runnability score for each media content item. A runnability score can be calculated based upon a variety of methods and factors, such as comparison to other content known to have desired characteristics or properties that are suitable for running. For example, the runnability scores can be calculated based on beat strength and tempo regularity of audio signals of the media content items. Additional details regarding how a runnability score can be calculated for a media content item are provided in U.S. Patent Application Ser. No. 62/163,921, titled IDENTIFYING MEDIA CONTENT, filed on May 19, 2015, the entirety of which is hereby incorporated by reference, and discussed in further detail herein with reference to FIGS. 8 and 9.

Figure 5:
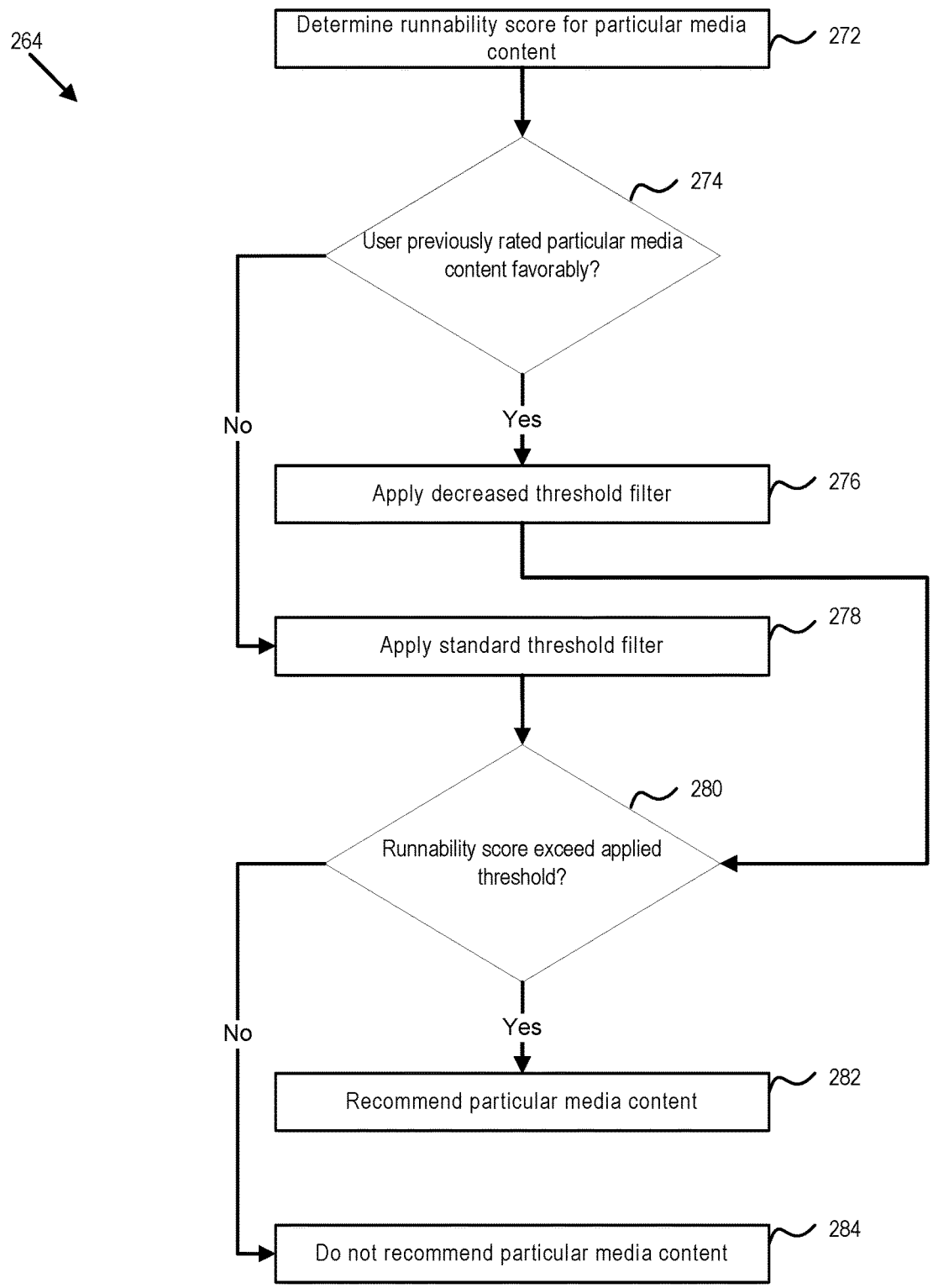
FIG. 5 illustrates an example method of filtering media content based upon criteria per the method shown in FIG. 4.

Additional details on the filtering of the step 264 are provided with reference to FIG. 5.

Finally, at step 266, filtered media content items having the desired tempo are selected. Additional details on this process are provided with reference to FIG. 6.

At FIG. 5, the filtering of the media content of the step 264 is described in more detail.

At step 272, the runnability score for a particular media content item is determined. This can be accomplished using the processes described above. In some embodiments, the runnability score is a value that corresponds to how similar a media content item is to the positive training examples as calculated using the runnability model. In some embodiments, the runnability score is a numerical value in the range of 0-1 in which higher values indicate the media content item is more similar to the positive training examples than a lower value. Alternatively, the runnability score may be stored as part of the metadata associated with the media content item.

Next, at step 274, a determination is made regarding whether or not the user previously rated the particular media content item. For example, as described further below, the user U can rate a particular media content item as one the user likes or dislikes. If the user has previously liked the particular media content item, control is passed to step 276, and a decreased threshold filter is used. Otherwise, control is passed to step 278, and a standard filter threshold is used.

For example, if the user has previously "liked" the particular media content item, the decreased threshold filter may require that the runnability score for the media content item be at least 0.4. Alternatively, if the media content item has not been previously rated, the standard threshold filter may require that the runnability score for the media content item be at least 0.6. In this manner, media content items that were previously marked as "liked" are favored.

Next, at step 280, the relevant filter (i.e., decreased or standard threshold) is applied. If the media content item exceeds the threshold of the applied filter, control is passed to step 282, and the media content item is recommended to the user. Otherwise, control is passed to step 284, and the media content item is not recommended.

Figure 6:
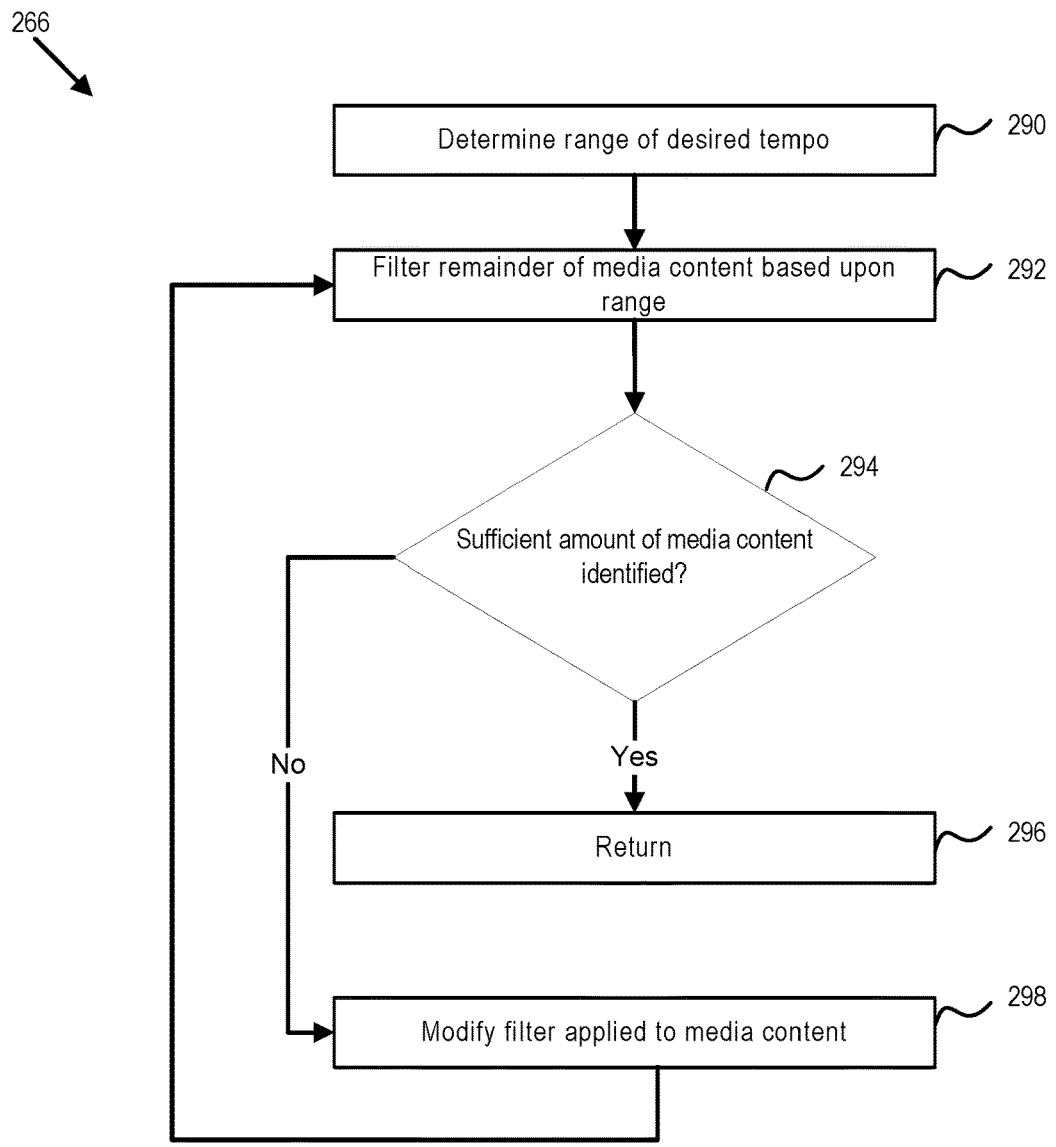
FIG. 6 illustrates another example method of filtering media content based upon criteria per the method shown in FIG. 5.

Referring now to FIG. 6, additional details are provided about the step 266 of filtering the media content based upon tempo.

At step 290, a desired tempo range is determined. This range is based upon the desired tempo that is either calculated from the media content selected by the user, the tempo that is specifically selected by the user, and/or by one or more automated processes of determining a desired tempo, such as by an analysis of heart rate, as described above.

The desired tempo is converted to a range of tempos, as is noted above. In some examples, this range can have various scales, such as 2 beats, 5 beats, 10 beats, etc. For example, if the desired tempo is 178, that tempo is converted to a range of 175-180.

In another example, the system is programmed to define a target number of songs to return, such as 5, 10, 15, 20, 50 100. For instance, if the target is to return 10 songs around 178 BPM, and given the number of songs available around that tempo, the resolution or range for the tempo can be modified, such as low as +/−0.5 BPM or a large as +/−7 BPM. The dynamic range is dependent on the size of the portfolio of media content, which can be driven by such factors as how the runnability scores are calculated. In other examples, the songs are simply ranks based upon how far each song is from the desired tempo, and the desired number of songs is selected based upon that ranking. In other instances, the range to find desired content is dynamically calculated based upon multiple factors, such as size of portfolio and runnability.

This range is then used at step 292 to filter the media content. Specifically, the tempo of each media content item is analyzed to determine if the tempo falls within the range. As noted above, each media content item may include metadata defining the tempo for that media content item. The tempo metadata can be used to determine if the media content item falls within the desired tempo range.

The media content falling within the desired range is then analyzed at step 294 to determine if sufficient media content has been identified. For example, if the range is a tempo of 175-180 beats per minute, perhaps 1000 songs fall within that range. In such an instance, a sufficient amount of media content has been identified, and control is provided to step 296, where the process continues.

However, if the number of media content items with the desired tempo is small, such as less than 100, less than 50, less than 20, less than 10, and/or less than 5, control can instead be passed to step 298, and the filtering of the content media can be modified.

One possible modification is to expand the range of tempos. In the example, the range could be expanded to be 170-185 in order to attempt to capture more media content items. In another example, other thresholds, such as the thresholds associated with the runnability scores used in the step 264 can be loosened. In yet another example, the tempo ranges can be halved or doubled (as noted above), which can result in tempos that provide similar guidance when running. Other configurations are possible.

Once the filters have been modified, control is passed back to the step 290 and the step 266 of filtering the media content based upon tempo is performed again with the modified filters.

Although filtering based upon criteria such as runnability and tempo are provided in the examples, other criteria can also be used to filter the media content. Examples of other criteria include the strength of the beat, the general energy of the content, the similarity of the content to other items. Other filtering based upon such criteria as desired genre, mood, or age (i.e., era) can also be used.

Referring now to FIG. 7, an example tempo-based content playback screen 400 displayed by some embodiments of the user interface 164 of the media-playback device 102 is shown. In some embodiments, the tempo-based content playback screen 400 is displayed in response to receiving a request by the user to select media content of a desired tempo.

In some embodiments, the tempo-based content playback screen 400 includes a playlist information message 402, a previous media content item display panel 404, a current media content item display panel 406, a next media content item display panel 408, a current media content item information message 410, a dislike control 412, a like control 414, a tempo information message 416, and a pause control 418.

The playlist information message 402 operates to display information about the currently playing playlist of media content items. The playlist may be a pre-defined playlist of media content items that correspond to an acquired cadence or an ad-hoc playlist generated by the media-playback device 102 or the media-delivery system 104 based on the acquired cadence. In some embodiments, the playlist information message 402 displays a title provided with a pre-defined playlist (e.g. "Outdoor Running," "Spin Class," "Peak Performance," etc.). In some embodiments, the playlist information message 402 displays information that relates to the media content items included in an ad-hoc playlist such as a region (e.g., Sweden, Europe, U.S., etc.), a genre (e.g., Country, Rock, Rap, etc.), a mood (e.g., calm, happy, etc.), an era (e.g., 70's, 80's, 90's, 00's, etc.), or popularity (e.g., Top 50, etc.).

The previous media content item display panel 404 operates to display information about the previously played media content item such as an image associated with the previously played media content item (e.g., an album cover, an artist photograph, etc.). The current media content item display panel 406 and the next media content item display panel 408 operate similarly with respect to the currently playing media content item and the media content item that is schedule to play next. In some embodiments, the user interface 164 operates to cause the next or previous media content item to begin playback in response to detecting a swipe input to the left or right over the current media content item display panel 406. Additionally, in some embodiments, the user interface 164 operates to cause the previously played media content item to begin playback in response to detecting a touch input on the previous media content item display panel 404. Similarly, in some embodiments, the user interface 164 operates to cause the next media content item to begin playback in response to detecting a touch input on the next media content item display panel 408.

The current media content item information message 410 operates to display information about the currently playing media content item. Some embodiments display one or more of the following: a title, an artist name, an album name, a current position, a total length, and a tempo.

The dislike control 412 and the like control 414 operate to receive inputs indicating that a user dislikes or likes the currently playing media content item. In some embodiments, the media-playback device stores a like/dislike value associated with the currently playing media content item upon actuation of either the dislike control 412 or the like control 414. The value may be stored locally on the media-playback device 102 or remotely on the media-delivery system 104 or elsewhere. In some embodiments, one or both of the media-playback device 102 and the media-delivery system 104 use the like/dislike values that have been previously stored in selecting media content items for future playback. Additionally, in at least some embodiments, upon actuation of the dislike control 412, the currently playing media content item stops playing immediately or after a period of time and a new media content item begins to play.

The tempo information message 416 operates to present information to the user about the tempo of the current media content item. In some embodiments, the tempo information message 416 displays a numeric value representing the user U's current tempo selection.

As noted, in some embodiments, the user can select a particular desired tempo manually. In such an example, the user can select the tempo information message 416 to bring up increase/decrease tempo arrows and/or a keypad that allows the user to directly input a desired tempo. Once the desired tempo is inputted by the user, the system can provide media content and/or samples at the desired tempo for the user.

Additionally, in some embodiments, the tempo information message 416 also presents information related to whether the tempo has recently changed. For example, the tempo information message 416 may include an arrow pointing up if the tempo has recently increased and an arrow pointing down if the tempo has recently decreased.

Alternatively, the tempo may be displayed in a first color to indicate a recent increase, a second color to indicate a recent decrease, and a third color to indicate a stable tempo. As yet another alternative, the tempo information message 416 may blink or otherwise indicate the occurrence of a recent change in tempo. In yet another embodiment, the tempo information message 416 may operate to indicate how a current tempo compares to a goal or target cadence using any of the previously mentioned visual indicators.

In yet other examples, information in addition to or other than tempo can be displayed. For example, the information message 416 can be configured to display the user U's heart rate. In yet another example, the information message 416 can be configured to display an estimated cadence, as described in U.S. Patent Application Ser. No. 62/163,840, titled CADENCE DETERMINATION AND MEDIA CONTENT SELECTION, filed on May 19, 2015, the entirety of which is hereby incorporated by reference.

The pause control 418 operates to receive a pause input from the user. In some embodiments, the pause input triggers the media-playback device 102 to pause cadence acquisition. Beneficially, by pausing cadence acquisition, the user can take a break or otherwise change cadence without causing the playback of media content items to change. Users may take break for many reasons, such as to rest/recover, to wait to safely cross an intersection, or to wait for a running partner. Users may temporarily change cadence for many reasons as well such as to climb a stair case or a big hill, to cross rugged terrain, to weave through heavy traffic, etc. Additionally, in some embodiments, the pause input also triggers the media-playback device 102 to pause playback of the media content items.

Figure 8:
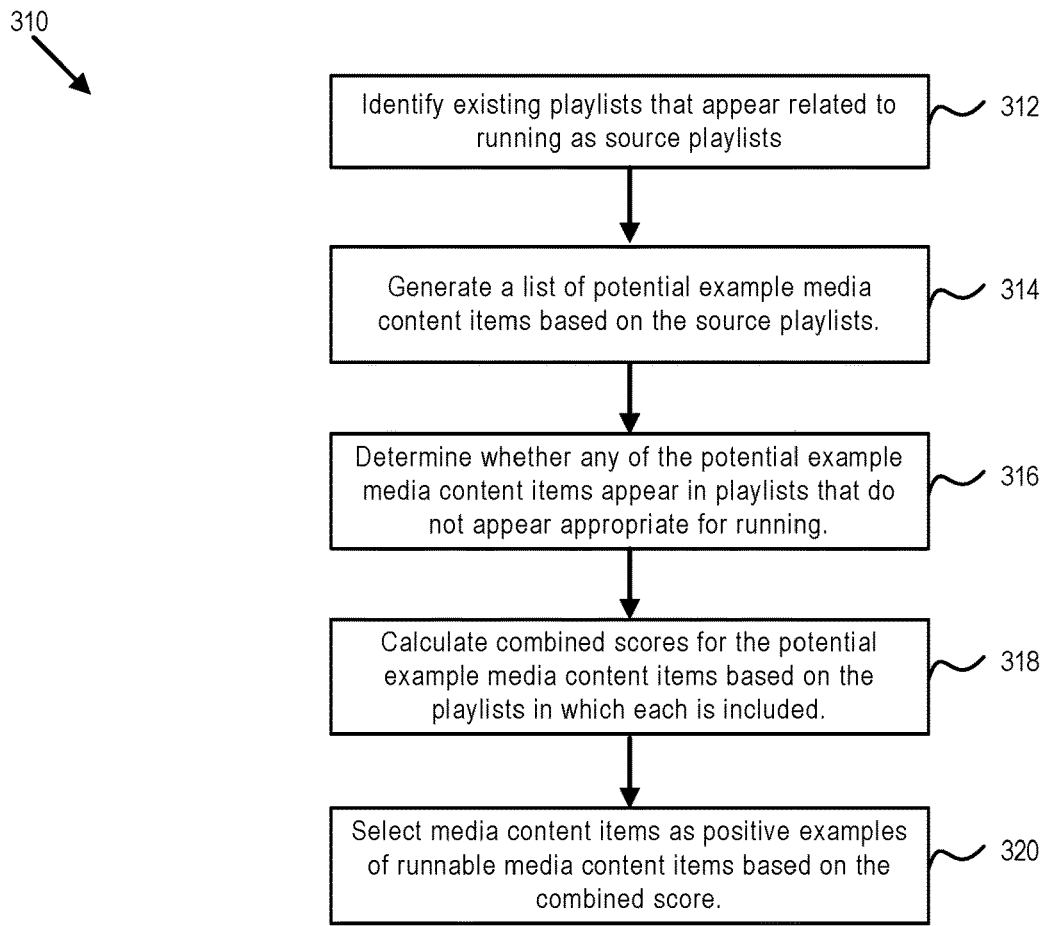
FIG. 8 illustrates an example method of acquiring a list of positive examples of runnable media content items.

FIG. 8 illustrates an example method 310 of acquiring a list of positive examples of runnable media content items. Such a method can be used, for example, to identify media content items as runnable based on the playlists users have created.

At operation 312, playlists that appear related to running are identified as source playlists. The playlists may be identified by analyzing the playlists 216. In some embodiments, source playlists are identified based on the inclusion of certain words or phrases in a title or description associated with the playlist. For example, words that are related to running (e.g., run, running, jog, marathon, 5 k, etc.) may be used to identify source playlists. Additionally, in some embodiments, words that relate to fitness (work out, health club, training, etc.) are also used to identify source playlists. Furthermore, in some embodiments, words that relate to other types of repetitive-motion activities are also used to identify source playlists.

At operation 314, a list of potential example media content items is generated based on the source playlists. In some embodiments, all media content items appearing in at least a predetermined number of play lists are included in the list. In embodiments, the predetermined number is 1, 2, 5, 10, 50, 100, 500, or another number.

Further some embodiments, analyze the source playlists to further determine the relevance of the play list to running. The analysis may be based on many factors including the words that were used to identify the source playlist, whether the words appeared in a title or a description, the curator of the play list, the number of users that follow the playlist, the number of times the playlist has been played, etc. In some embodiments, a weighting scheme is used to calculate a weight value for the source playlists. Example weighting schemes used in some embodiment include: weighting a playlist that includes words associated with running higher than a playlist that includes words associated with fitness or another repetitive-motion activity; weighting a playlist that includes a relevant word in a title higher than a playlist that includes a relevant word in a description; weighting a play list curated by a streaming service (or professional curator) higher than a playlist curated by a user (or vice versa); weighting a playlist with more followers higher than a playlist with fewer followers; weighting a playlist that has been played more times higher than a playlist that has been played fewer times. In some embodiments, the weighted values of the source play list that include a particular potential example media content item are summed (or otherwise combined) and the resulting value (referred to as a positive playlist inclusion score herein) is compared to a predetermined threshold. The potential example media content items with a positive playlist inclusion score that exceeds the threshold may be analyzed further as described below.

At operation 316, it is determined whether the potential example media content items are included in playlists that appear inappropriate for running. In some embodiments, playlists are identified as inappropriate for running based on the inclusion of words or phrases in a title that are related to relaxing (e.g., calming, chill, relax, wind down, sleep, calm, etc.). In some embodiments, a negative playlist inclusion score is calculated for the potential example media content items based on being included in playlists that are identified as not being appropriate for running. The negative playlist inclusion score for a potential example media content item is calculated in a similar manner and according to similar factors as the positive playlist inclusion score.

At operation 318, a combined playlist inclusion score is calculated for the potential example media content items included in the list based on the playlists in which the potential example media content items are included. In some embodiments, the combined playlist inclusion score is calculated as a ratio of the positive playlist inclusion score to the negative playlist inclusion score. In other embodiments, the combined playlist inclusion score is calculated otherwise, such as by calculating a difference between the positive playlist inclusion score and the negative playlist inclusion score. Further, in some embodiments, the combined playlist inclusion score is calculated as a difference between or ratio of the number of play lists that appear related to running and the number of play lists that appear inappropriate for running in which the media content item is included.

At operation 320, potential example media content items are selected as positive example media content items based upon the combined playlist inclusion score In some embodiments, potential example media content items that have a combined playlist inclusion score exceeding a predetermined threshold are selected as positive examples of runnable media content items. As an example, when the combined playlist inclusion score is calculated as a ratio, the predetermined threshold is two, three, four, five, or ten in some embodiments. Other embodiments use a predetermined threshold in a range of one to twenty-five. Additionally, in some embodiments, a predetermined number of media content items having the highest combined play list inclusion scores are selected as positive examples.

Figure 9:
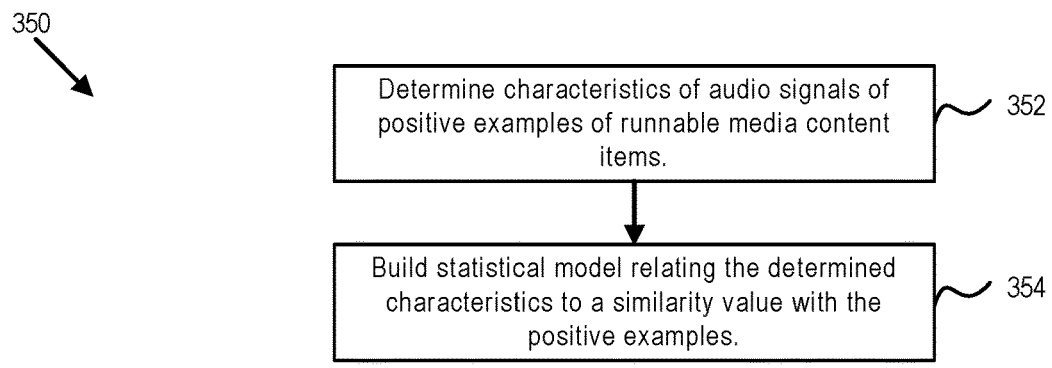
FIG. 9 illustrates an example method of building a runnability model based on positive examples of runnable media content items.

FIG. 9 illustrates an example method 350 of building a runnability model based on positive examples of runnable media content items. Such a method can be used, for example, to build a model for classifying or identifying additional media content items as runnable.

At operation 352, characteristics of the audio signals of the positive examples of runnable media content items are determined. In some embodiments, the audio signals of the positive examples are analyzed to determine the characteristics. Additionally, in some embodiments, some or all of the characteristics of the audio signals are retrieved from the media content metadata 214 or elsewhere.

Example characteristics determined by some embodiments include an average duration of a musical event such as a single note or other musical event, a tempo regularity, a percussivity, and a beat strength. In some embodiments, the average duration of a musical event is calculated in various ways, including by dividing a total number of musical events in a media content item by a duration of the media content item. The tempo regularity corresponds to the consistency of the beat in a media content item. In some embodiments, the tempo regularity is based on calculating a standard deviation or variance value for measurements of the tempo over multiple intervals of a media content item. The percussivity corresponds to the strength or contribution of percussive instruments (or synthesize equivalents) to the media content item. The beat strength is proportional to the loudness of musical events that happen in correspondence to a beat. Some embodiments also include characteristics that are determined by other machine learning models. For example, some embodiments include an energy characteristic that is calculated by a machine learning model trained to rate the relative energy levels of various media content items similarly to a user's rating. Other embodiments determine additional, different, or fewer characteristics.

At operation 354, the determined characteristics are used to build a statistical model that relates the determined characteristics to a similarity value to the positive examples. In some embodiments, the model is a function or equation that operates on the values of the various characteristics to calculate a value corresponding to the similarity to the positive examples. In some embodiments, the model represents each characteristic as a dimension in a multi-dimensional space. Further, in some embodiments, the model defines an equation to compute the likelihood of a media content item being similar to the positive examples as far as the modeled characteristics are concerned.

As noted previously, although many of the examples provided above are described with respect to running, other embodiments relate to other repetitive motion activities as well such as cycling, swimming, and rowing.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following disclosure.

What is claimed is:

1. A media system comprising:
   at least one processor; and
   at least one non-transitory computer-readable data storage device storing data instructions that, when executed by the at least one processor, cause the media system to:
   receive a selected tempo corresponding to a cadence of a repetitive-motion activity;
   identify a first set of media content comprising a plurality of media content items based upon at least a first range encompassing the selected tempo and a first threshold for a runnability score associated with each of the plurality of media content items, wherein the runnability score is computed by a runnability model, the runnability model being trained from a plurality of positive example media content items to consider characteristics including at least a beat strength and a tempo regularity, and the runnability model computes the runnability score at least based on one or more similarities between each of the plurality of media content items and the plurality of positive example media content items, and wherein the first threshold is decreased for media content items previously liked by a user of the media system;
   determine whether the first set contains at least a particular number of media content items; and
   when a determination is made that the first set does not contain at least the particular number of media content items:
   expand the first range to determine a second range encompassing the selected tempo;
   identify, based on the second range, additional media content to generate a second set of media content;
   add the second set of media content to the first set of media content; and
   provide the first set of media content and the second set of media content for playback during the repetitive-motion activity.

2. The system of claim 1, wherein the media system further comprises a server including the at least one processor.

3. The system of claim 1, wherein the media system uses the first threshold to filter the runnability score to identify the first set of media content, and a second threshold to filter the runnability score to identify the additional media content to generate the second set of media content, wherein the second threshold is less than the first threshold.

4. The system of claim 1, wherein the second range of tempos is larger than the first range of tempos.

5. The system of claim 1, wherein the media system uses repetitive-motion activity media metadata to identify portions of media content items suited for playback during a repetitive-motion activity.

6. A media system, comprising:
a media-playback device configured to receive a selection of a tempo corresponding to a cadence of a repetitive-motion activity of a user; and
a server comprising at least one processor; and at least one non-transitory computer-readable data storage device storing data instructions that, when executed by the at least one processor, cause the server to:
receive a selected tempo corresponding to a cadence of a repetitive-motion activity;
identify a first set of media content comprising a plurality of media content items based upon at least a first range encompassing the selected tempo and a first threshold for a runnability score associated with each of the plurality of media content items, wherein the runnability score is computed by a runnability model, the runnability model being trained from a plurality of positive example media content items to consider characteristics including at least a beat strength and a tempo regularity, and the runnability model computes the runnability score at least based on one or more similarities between each of the plurality of media content items and the plurality of positive example media content items, and wherein the first threshold is decreased for media content items previously liked by a user of the media system;
determine whether the first set contains at least a particular number of media content items; and
when a determination is made that the first set does not contain at least the particular number of media content items:
expand the first range to determine a second range encompassing the selected tempo;
identify, based on the second range, additional media content to generate a second set of media content;
add the second set of media content to the first set of media content; and
provide the first set of media content and the second set of media content to the media-playback device for playback during the repetitive-motion activity.

7. The system of claim 6, wherein the server is programmed to identify the first set of media content by filtering a plurality of the media content items based upon one or more criteria including at least the first range encompassing the selected tempo and the first threshold for the runnability score.

8. The system of claim 6, wherein the server uses the first threshold to filter the runnability score to identify the first set of media content, and a second threshold to filter the runnability score to identify the additional media content to generate the second set of media content, wherein the second threshold is less than the first threshold.

9. The system of claim 6, wherein the second range of tempos is larger than the first range of tempos.

10. A method for selecting media content based upon a tempo corresponding to a cadence of a repetitive-motion activity of a user, the method comprising:
receiving a selected tempo corresponding to a cadence of the repetitive-motion activity;
identifying a first set of media content comprising a plurality of media content items based upon at least a first range encompassing the selected tempo and a first threshold for a runnability score associated with each of the plurality of media content items, wherein the runnability score is computed by a runnability model, the runnability model being trained from a plurality of positive example media content items to consider characteristics including at least a beat strength and a tempo regularity, and the runnability model computes the runnability score at least based on one or more similarities between each of the plurality of media content items and the plurality of positive example media content items, and wherein the first threshold is decreased for media content items previously liked by a user of the media system;
determining whether the first set contains at least a particular number of media content items; and
when a determination is made that the first set does not contain at least the particular number of media content items:
expanding the first range to determine a second range encompassing the selected tempo;
identifying, based on the second range, additional media content to generate a second set of media content;
add the second set of media content to the first set of media content; and
providing the first set of media content and the second set of media content for playback during the repetitive-motion activity.

11. The method of claim 10, wherein identifying the first set of media content includes:
filtering the plurality of media content items to identify media content items having tempos falling within the first range of tempos.

12. The method of claim 11, wherein identifying the first set of media content further includes filtering the plurality of media content items based upon the first threshold for the runnability score associated with each of the plurality of media content items.

13. The method of claim 12, further comprising relaxing the filtering of the plurality of media content items when identifying the additional media content to generate the second set of media content.

14. A media system, comprising:
a server comprising at least one processor; and
at least one non-transitory computer-readable data storage device storing data instructions that, when executed by the at least one processor, cause the server to:
receive a selected tempo corresponding to a cadence of a repetitive-motion activity from a media-playback device;
identify a first set of media content comprising a plurality of media content items based on at least the selected tempo and a first threshold for a runnability score associated with each media content item, the runnability score being computed by a runnability model, the runnability model being trained by a plurality of positive example media content items to consider characteristics including at least a beat strength and a tempo regularity, and the runnability model computes the runnability score at least based on one or more similarities between each media content item and the plurality of positive example media content items, and wherein the first threshold is decreased for media content items previously liked by a user of the media system;
determine whether the first set contains at least a particular number of media content items; and
when a determination is made that the first set does not contain at least the particular number of media content items:
  identify additional media content to generate a second set of media content using a second threshold for the runnability score, the second threshold for the runnability score being less than the first threshold for the runnability score;
  add the second set of media content to the first set of media content; and
  provide the first set of media content and the second set of media content to the media-playback device for playback during the repetitive-motion activity.

* * * * *